Dec. 13, 1966    MASAO HORINO    3,292,039
LIGHT-INHIBITING MARINE FLASHER
Filed Dec. 11, 1963
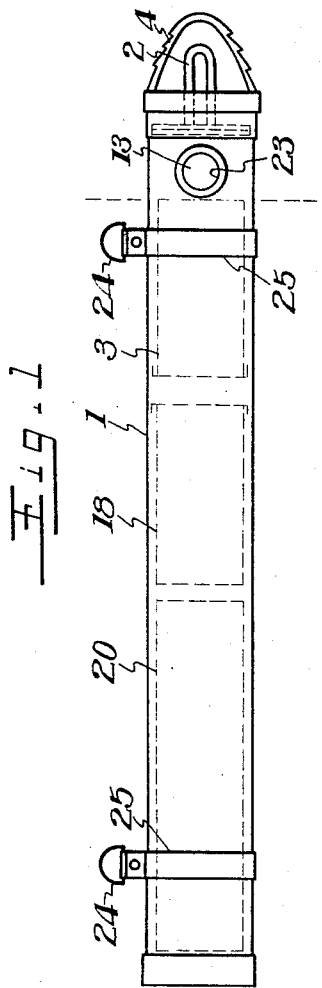
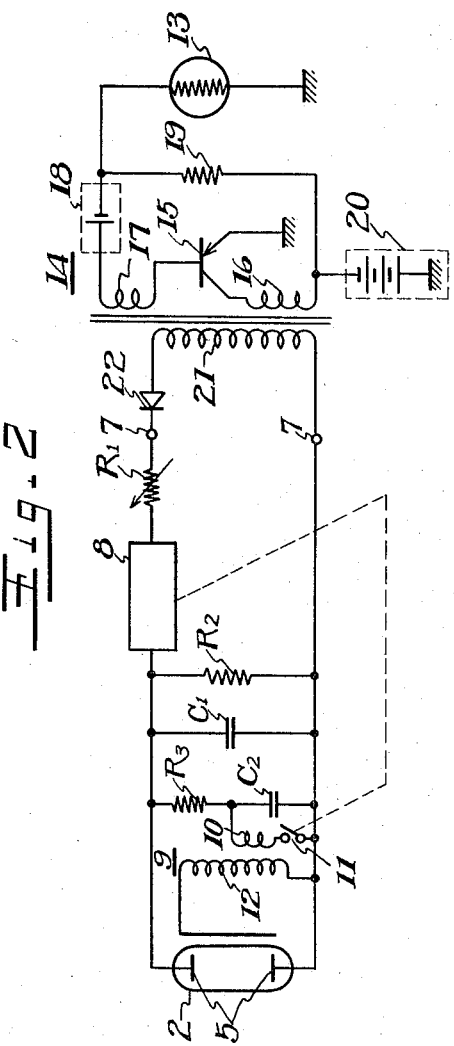
INVENTOR.
Masao Horino
BY
ATTORNEYS 3,292,039
LIGHT-INHIBITING MARINE FLASHER
Masao Horino, 81 Nakane-cho, Meguro-ku, Tokyo, Japan
Filed Dec. 11, 1963, Ser. No. 329,715
1 Claim. (Cl. 315—159)

This invention relates to an electro-flash lamp and more particularly to such an electro-flash pilot lamp which is suitable for various indication uses on the water.

One object of this invention is to provide an electro-flash pilot lamp which is suitable for use in fishery, for example, for indicating the position of a whale in the sea, which is so constructed as to emit blinking flashes only when it is dark and the visibility is bad on the sea, for instance at night and automatically remains inoperative when bright in the daytime to avoid unnecessary consumption of a battery to enable the lamp to emit so strong flashes as to be seen from far away and the lamp itself can float on the sea.

Other objects, features and advantages of this invention will become apparent from the following description taken in conjunction with the accompanying drawings in which, FIGURE 1 is a front view illustrating an example of an electronic flash pilot lamp according to this invention; and FIGURE 2 is its electrical connection circuit diagram.

Referring now to the drawings, an embodiment of the present invention will hereinafter be explained. In this invention a flash lamp 2 and its automatic blinking control device 3 are encased in a tubular sealed container 1.

A transparent window 4 is provided at a suitable place of the container 1, for instance at the top thereof and the flash lamp 2 is arranged in a manner so as to look out through the transparent window 4.

As the flash lamp 2, a xenon discharge tube may preferably be employed having enclosed therein xenon gas. Generally the xenon discharge tube can flash repeatedly at high speed cycle and the interval of flashes may be perceived distinctly. The character of the light of flash is such that the flash may be distinguished clearly from other kinds of lights even under the direct sun beam and the brightness is very high, so that the xenon discharge tube has very excellent characteristics as a blinking signal lamp. Accordingly, the flash of the xenon discharge tube may be noticed from a far distance on the sea at night.

The automatic blinking control device 3 of the flash lamp 2 automatically controls the blinking of the flash lamp in accordance with the brightness in its surroundings, one example of the connection of which is illustrated in FIGURE 2.

In the drawings, 5 shows confronting electrodes of the flash lamp, namely the xenon discharge tube and 6 is a trigger electrode. 7 shows direct current power source terminals and has a high voltage suitable for the discharge of the xenon tube, for example more than 100 v., but for obtaining this voltage a device is used which will be described later. To the source terminal 7 is connected in series a time constant circuit composed of a resistor $R_1$ and a capacitor $C_1$ in parallel thereto, and the capacitor $C_1$ is charged through the resistor $R_1$. A relay 8 is inserted in a place where the discharging current passes and a normally open contact 11 of the relay 8 is inserted to a primary winding 10 of a transformer 9 of a trigger circuit connected in parallel to the capacitor $C_1$, and in addition the trigger electrode 6 of the xenon discharge tube 2 is connected to a secondary side 12 of the transformer 9. $R_3$ is a resistor which adjusts suitably the primary side current of the transformer 9 and $C_2$ is a capacitor connected in parallel relation with respect to the contact 11 for eliminating sparks thereof. To the opposite side of the power source regarding the relay 8 is connected a biasing resistor $R_2$ in parallel to the capacitor $C_1$, by which the current to the relay 8 is adjusted suitably to control the discharging cycle. This the relay 8 is operated by the time constant circuit $R_1C_1$ to switch the contact 11 inserted on the side of the primary winding 10 of the transformer 9, whereby pulses are produced on the secondary side 12 of the transformer 9 and they are impressed to the trigger electrode 6 of the discharge tube 2 to blink the discharge tube 2.

13 is a photosensitive device such as a cadmium sulfide cell which varies its resistance value with the amount of light. 14 is an oscillator to be controlled by the resistance value of the device 13. This oscillator 14 is provided with, for example, a PNP transistor 15. A primary winding 16 of a transformer T is inserted in the collector circuit of the transistor 15 and a secondary winding, namely a back coupling winding 17 is connected to its base circuit, and a suitable positive voltage is applied to the base by a power source 18, usually maintaining the transistor in the cut-off condition. To the photosensitive device 13, a power source 20 which is common to the transistor 15 is connected through a resistor 19 in such a manner that the photosensitive device produces variations in voltage across the resistor 19 in response to variations in light and one portion of the voltage of the power source 18 is removed to released the transistor from the cut-off condition. Accordingly, the start and stop of the oscillation of the oscillator 14 including the transistor 15 is accurately controlled by the photosensitive device 13. Thus when the amount of light to the photosensitive device 13 is small its resistance increases, so that the oscilaltor 14 is released from being cut-off and works to produce high alternating current voltage in a tertiary winding 21 of the transformer T. This alternating current voltage is rectified by a rectifier 22 which is connected in series with the tertiary winding 21 and taken out from the terminal 7 to be supplied to the blinking circuit of the discharge tube 2.

Therefore, although the photosensitive device 13 of the automatic blinking control device 3 is enclosed in a container 1, a transparent window 23 is provided on the container 1, from which the photosensitive device 23 looks out. In this case, the window 23 may preferably be provided in the neighborhood of the flash lamp 2 but it must be provided outside the direction of the flash of the flash lamp in order that the photosensitive device 13 may not receive the flash of the lamp directly.

Two batteries 18 and 20 which are relatively heavy for the automatic blinking control device 3 are placed at the opposite end to the transparent windows 4 and 23, namely at the base portion of the container and a suitable space is formed in the container 1. Thus electro-flash lamp device L is so constructed that when it is thrown down into the sea its buoyancy and its whole weight balance and the top end portion having the windows 4 and 23, namely the top end portion of the container 1 from the dotted line X–Y rises up to the surface of the sea.

Furthermore, a hook 24 is provided on the body of the container 1 by winding a band 25 or the like thereon, therefore a string is hooked on the hook 24 to enable one to draw the lamp L towards him with a bamboo pole or the like.

According to the present invention described above, the electro-flash pilot lamp L automatically operates to blink only when dark, for example at night and it does not work in the daytime, so that unnecessary consumption of batteries can be avoided and the lamp can be used for a long time. In addition, when a xenon gas discharge tube is used as a flash lamp it emits very strong flashes, so that when it is put up high fixed on a bamboo pole or the like the flash can be seen from a distance of about 10 sea miles by the aid of a telescope. Since the lamp has been so made as to float on the water, if it is dropped on the sea, it can be seen from a distance of 5 sea miles or so and in addition it can be withdrawn.

It will be apparent that many modifications and variations may be effected without departing from the scope of the novel concept of this invention.

What is claimed is:

An electro-flash pilot lamp comprising a tubular sealed container having two transparent windows at one end thereof, an electro-flash lamp having main electrodes and a trigger electrode visible through one of said transparent windows, a photoelectric element visible through the other of said transparent windows, a battery at the other end of said tubular sealed container having one terminal connected to a first transformer winding and the collector-emitter path of a transistor through its other terminal, means comprising the series connection of the base of the transistor, a second winding of said transformer, a bias source normally preventing conduction of said transistor and said photo-electric element for generating oscillating energy in the absence of light, means comprising a third winding of said transformer furnishing rectified high potential, and an automatic blinking control device for controlling the blinking of said electro-flash lamp in the middle part of said tubular sealed container, said device having a capacitor connected to the main electrodes of said electro-flash lamp, a bias resistor connected in parallel to said capacitor, a relay inserted between one of the terminals of said capacitor and said rectifying means, a variable resistor connected in series to said relay and a trigger transformer having a primary winding and a secondary winding, said relay having a normally open relay contact connected to said primary winding, said secondary winding being connected to the trigger electrode of said electro-flash lamp, the buoyancy of said tubular sealed container being balanced to its whole weight in such a manner that said transparent windows of said tubular sealed container comes up to the water surface when said tubular sealed container is thrown into the water.

References Cited by the Examiner
UNITED STATES PATENTS

| | | | |
|---|---|---|---|
| 2,043,671 | 6/1936 | McMaster | 315—151 X |
| 2,803,838 | 8/1957 | Wales | 9—8.3 |
| 2,918,607 | 12/1959 | Peepas et al. | 315—200.1 |
| 2,973,456 | 2/1961 | Smyth | 315—200.1 |
| 2,982,881 | 5/1961 | Reich | 315—200.1 |
| 3,130,349 | 4/1964 | Mallory | 315—151 |
| 3,171,057 | 2/1965 | Buckingham | 315—241 |
| 3,229,158 | 1/1966 | Jensen | 315—241 |

JAMES W. LAWRENCE, *Primary Examiner.*

R. SEGAL, *Assistant Examiner.*